No. 872,211. PATENTED NOV. 26, 1907.
L. F. ADT.
EYEGLASS MOUNTING.
APPLICATION FILED FEB. 17, 1906.

UNITED STATES PATENT OFFICE.

LEO F. ADT, OF ALBANY, NEW YORK.

EYEGLASS-MOUNTING.

No. 872,211.  Specification of Letters Patent.  Patented Nov. 26, 1907.

Application filed February 17, 1906. Serial No. 301,561.

*To all whom it may concern:*

Be it known that I, LEO F. ADT, of Albany, in the county of Albany and State of New York, have invented certain new and useful Improvements in Eyeglass-Mountings; and I do hereby declare the following to be a full, clear, and exact description of the same, reference being had to the accompanying drawings, forming a part of the specification, and to the reference-numerals marked thereon.

My present invention relates to improvements in eyeglass mountings, particularly of that class in which the lenses are connected by a relatively rigid bridge and guards or portions engaging the nose of the wearer are adapted to be separated by the fingers of the wearer, grasping arms extending forward of the plane of the lenses, and it has for its objects to simplify and improve the construction and operation of the guards and operating devices therefor whereby the parts may be readily formed and assembled all as will be hereinafter described and the novel features pointed out in the claims at the end of the specification.

Figure 1:
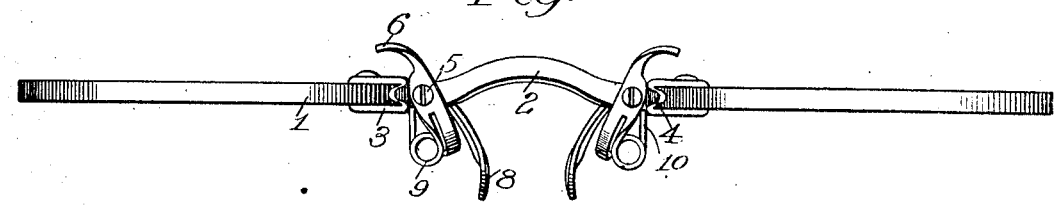
Figure 2:
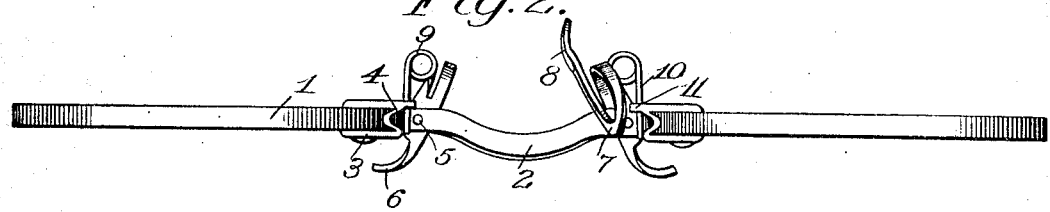
Figure 3:
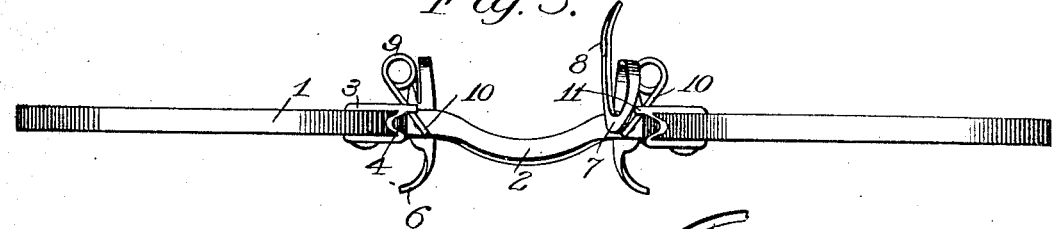
Figure 4:
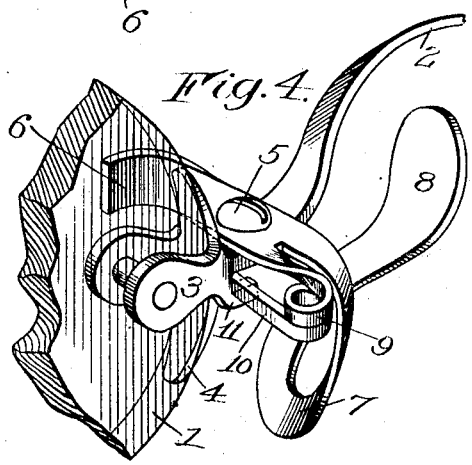

In the drawings: Figure 1 is a top plan view of a pair of eyeglasses provided with my invention. Fig. 2 is a bottom plan view, one of the nose pads being removed. Fig. 3 is a similar view showing the position occupied by the parts when the pads are separated. Fig. 4 is a perspective view of one of the guards and a portion of the bridge or connecting part.

Similar reference numerals in the several figures indicate similar parts.

1 indicates the lenses connected by the relatively rigid arched bridge 2 which latter in the present embodiment has the lens holding ears 3 and the edge bearing lugs 4 formed upon it and the portion between the arch of the bridge and the lens forms as substantially flat support upon which the guards are pivotally mounted.

The guards are each constructed of a single piece of more or less resilient sheet metal and shaped as shown in Fig. 4, to form a body portion resting upon the support and pivoted on a stud or screw 5 secured thereto and extending transversely of the bridge, the forward end being preferably bent vertically to form an operating end 6 while the portion in rear of the bridge is divided into two parts, one being bent to form the pad or bearing portion for engaging the wearer's nose and the other to form the spring for turning the guard on its pivot.

In the present embodiment the part or arm constituting the bearing pad or nose gripping portion extends downwardly in rear of the bridge and upwardly forming the lower bearing loop 7 and the upwardly extending free arm being broadened to form the pad 8, said loop and arm being twisted as shown to conform more or less to the contour of the wearer's nose and having an efficient bearing thereon. The other of the rearwardly extending parts of the guard is preferably narrower than the one having the nose bearing portion and is given a quarter turn and formed into a loop or coil 9 the axis of which extends substantially vertically or in a plane parallel to the lenses, its free end 10 engaging and having a sliding bearing upon the mounting beneath the bridge, being retained in position by a lug 11 formed on the latter as shown.

The coils 9 are preferably formed by giving the material a turn and a half to prevent liability of breakage and are so disposed on the respective guards as to move the bearing pads inwardly or toward the wearer's nose, effectually holding the mounting in place thereon and permitting the application and removal of the glasses by pressing together the forward operating ends of the guards.

By providing the operating springs upon the guards and locating them in rear of the lenses not only are the parts simplified requiring but four screws for connecting all of the parts, but I am enabled to construct the entire guard of a single stamping of sheet metal and the coil being formed by bending the metal transversely of the plane of the sheet from which it is constructed, sufficient resiliency can be obtained without liability of breakage. It will be understood that instead of forming the nose bearing portion of the loop 7 and the arm having the pad 8 thereon, any other suitable construction could be employed though I prefer that shown, as it affords a firm gripping device capable of adjustment and is readily made. The guards as a whole could of course be made as separate articles of manufacture and variously applied to other bridges and lens holding devices.

I claim as my invention:

1. In an eyeglass mounting, the combination with the support, of a guard pivoted thereon and having the forwardly projecting operating arm, the spring arm extending rearwardly of the first and then forwardly and having a sliding engagement with the support and the nose bearing portion also located in rear of the pivot.

2. In an eyeglass mounting, the combination with the support, of a guard pivoted thereon and having the operating arm extending forward of the pivot, the rearwardly extending arm, coiled and extending forwardly and having a sliding engagement with the support and another arm in rear of the pivot having a bearing pad or pads thereon.

3. In an eyeglass mounting, the combination with the support, of a guard pivoted on the support, said guard embodying a forwardly extending operating arm, and two rearwardly extending portions, one of said portions extending forward again and having a sliding bearing on the support and the other portion having a nose bearing pad formed thereon.

4. In an eyeglass mounting, the combination with the support, of a guard pivoted on the support, said guard embodying a forwardly extending operating arm and two rearwardly extending portions one of which is given a quarter turn, coiled and extended forwardly, its free end having a sliding bearing on the support, and the other rearwardly extending portion having the upper and lower nose bearing pads.

5. In an eyeglass mounting, the combination with the support, of a guard pivoted on the support, said guard embodying the forwardly extending operating arm, and two rearwardly extending portions one of which is given a quarter turn, coiled and extended forwardly, its free end having a sliding bearing on the support and the other rearwardly extending portion being twisted slightly and extending downward, forward and upward to form the lower bearing loop and the upper bearing pad.

6. In an eyeglass mounting, the combination with the lenses, the bridge connecting them having the flat portions near the ends, the pivot studs on the latter and the lugs below, of the guards each constructed of flat metal having the flat portion resting on the bridge through which the studs are passed, the forwardly extending operating arms and the two rearwardly extending portions one formed into a coil and extending forwardly and engaging the lug, and the other portion bent downwardly and twisted slightly, thence extending upwardly forming a loop and having its upper free end enlarged, said loop and enlarged end forming bearing portions to engage the wearer's nose.

7. As an article of manufacture a guard for eyeglasses constructed of sheet metal having the flat body portion, the forward operating arm and in rear of the body portion divided into two parts one coiled and extending toward the operating arm and the other bent downward and then upward to form nose bearing pads.

LEO F. ADT.

Witnesses:
MICHAEL F. O'CONNOR,
EDWARD MURPHY, 2d.